(12) United States Patent
Li et al.

(10) Patent No.: US 11,775,247 B2
(45) Date of Patent: Oct. 3, 2023

(54) REAL-TIME SCREEN SHARING

(71) Applicant: MICROSOFT TECHNOLOGY LICENSING, LLC, Redmond, WA (US)

(72) Inventors: Bin Li, Redmond, WA (US); Ji-Zheng Xu, Redmond, WA (US); Yan Lu, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 765 days.

(21) Appl. No.: 16/625,617

(22) PCT Filed: May 24, 2018

(86) PCT No.: PCT/IB2018/000626
§ 371 (c)(1),
(2) Date: Apr. 13, 2020

(87) PCT Pub. No.: WO2018/234860
PCT Pub. Date: Dec. 27, 2018

(65) Prior Publication Data
US 2020/0310739 A1   Oct. 1, 2020

(30) Foreign Application Priority Data

Jun. 20, 2017 (CN) .......................... 201710471755.3

(51) Int. Cl.
*G06F 3/00* (2006.01)
*H04N 19/124* (2014.01)
(Continued)

(52) U.S. Cl.
CPC .......... *G06F 3/1462* (2013.01); *H04L 67/131* (2022.05); *H04N 19/00* (2013.01);
(Continued)

(58) Field of Classification Search
CPC ... G06F 3/1462; G06F 3/1454; H04N 19/124; H04N 19/164; H04N 19/172;
(Continued)

(56) References Cited

U.S. PATENT DOCUMENTS

| 5,949,948 A | * | 9/1999 | Krause .................. H04N 5/9262 386/346 |
| 6,741,648 B2 | | 5/2004 | Karczewicz et al. |

(Continued)

FOREIGN PATENT DOCUMENTS

| CN | 102771119 A | | 11/2012 | |
| CN | 104837048 A | | 8/2015 | |
| CN | 106688233 A | * | 5/2017 | ........... B64C 39/024 |

OTHER PUBLICATIONS

"First Office Action and Search Report Issued in Chinese Patent Application No. 201710471755.3", dated Dec. 1, 2021, 19 Pages.
(Continued)

*Primary Examiner* — Kyle M Lotfi
(74) *Attorney, Agent, or Firm* — Barta, Jones & Foley, PLLC

(57) ABSTRACT

In implementations of the subject matter described herein, there are provided a method and apparatus for real time screen sharing. During the screen sharing of two devices, if a certain condition is satisfied for an image encoded by a first device and an image decoded by a second device, the first device pauses image processing images. If the pause time of pausing satisfies a certain length, a parameter associated with an image compression ratio is adjusted. After the first device resumes image processing, the adjusted parameter is used to encode a new image captured on the first device. According to implementations of the subject matter described herein, a transmission code rate during the screen sharing can be controlled according to the pause time of pausing image processing. The implementations of the sub-
(Continued)

ject matter described herein can reduce transmission latency of screen sharing, thereby effectively ensuring the user experience.

20 Claims, 10 Drawing Sheets

(51) Int. Cl.
| | |
|---|---|
| *H04N 19/164* | (2014.01) |
| *H04N 19/172* | (2014.01) |
| *G06F 3/14* | (2006.01) |
| *H04N 19/00* | (2014.01) |
| *H04L 67/131* | (2022.01) |
| *G06F 3/01* | (2006.01) |
| *G06F 15/76* | (2006.01) |

(52) U.S. Cl.
CPC ......... *H04N 19/124* (2014.11); *H04N 19/164* (2014.11); *H04N 19/172* (2014.11); *G06F 3/01* (2013.01); *G06F 15/76* (2013.01)

(58) Field of Classification Search
CPC ........... H04N 21/6373; H04N 21/6379; H04N 21/234354; H04N 21/632; H04N 21/6583; H04N 19/103; H04N 19/146; H04N 19/17; H04N 19/00; H04L 67/38; H04L 67/131; G09G 2350/00; G09G 2340/02
See application file for complete search history.

(56) References Cited

U.S. PATENT DOCUMENTS

| | | | |
|---|---|---|---|
| 7,599,434 | B2 | 10/2009 | Reynolds et al. |
| 7,702,006 | B2 | 4/2010 | Kunii et al. |
| 7,895,521 | B2 | 2/2011 | Bhogal et al. |
| 8,254,704 | B2 | 8/2012 | Lu et al. |
| 8,477,842 | B2 | 7/2013 | Chang et al. |
| 8,649,426 | B2 | 2/2014 | White et al. |
| 9,131,021 | B2 | 9/2015 | Bhogal et al. |
| 9,424,659 | B2 | 8/2016 | Feris et al. |
| 2005/0289176 | A1* | 12/2005 | Johnston ............... G06F 3/1462 |
| 2007/0182728 | A1* | 8/2007 | Fujimori ............... G06F 3/1423 |
| | | | 345/204 |
| 2011/0216829 | A1 | 9/2011 | Raveendran |
| 2012/0300127 | A1 | 11/2012 | Morard |
| 2013/0254330 | A1* | 9/2013 | Maylander ............. H04L 65/70 |
| | | | 709/217 |
| 2013/0257687 | A1 | 10/2013 | Chun et al. |
| 2014/0240440 | A1 | 8/2014 | Seo et al. |
| 2015/0016542 | A1 | 1/2015 | Rosewarne et al. |

OTHER PUBLICATIONS

"Office Action Issued in European Patent Application No. 18752248.7", dated Jun. 16, 2021, 7 Pages.
"Second Office Action Issued in Chinese Patent Application No. 201710471755.3", dated May 6, 2022, 13 Pages.
"Office Action Issued in Chinese Patent Application No. 201710471755.3", dated Aug. 3, 2022, 16 Pages.
"Notice of Allowance Issued in Chinese Patent Application No. 201710471755.3", dated Jan. 28, 2023, 4 Pages.
International Search Report and Written Opinion for PCT/IB2018/000626, dated Oct. 9, 2018.

* cited by examiner

LEAF SHAPE

- Leaf shape refers to the shape of the leaves
- Common leaf shapes include: needle-shaped, lanceolate, inverted-lanceolate, bar-shaped, sword-shaped, round, oblong, oval, oval, obovate, spoon-shaped, fan-shaped, sickle-shaped, heart-shaped, Inverted heart shape, kidney shape, fiddle shape, shield shape, arrow shape, halberd shape, diamond shape, triangle shape, scale shape, etc.

FIG. 7A

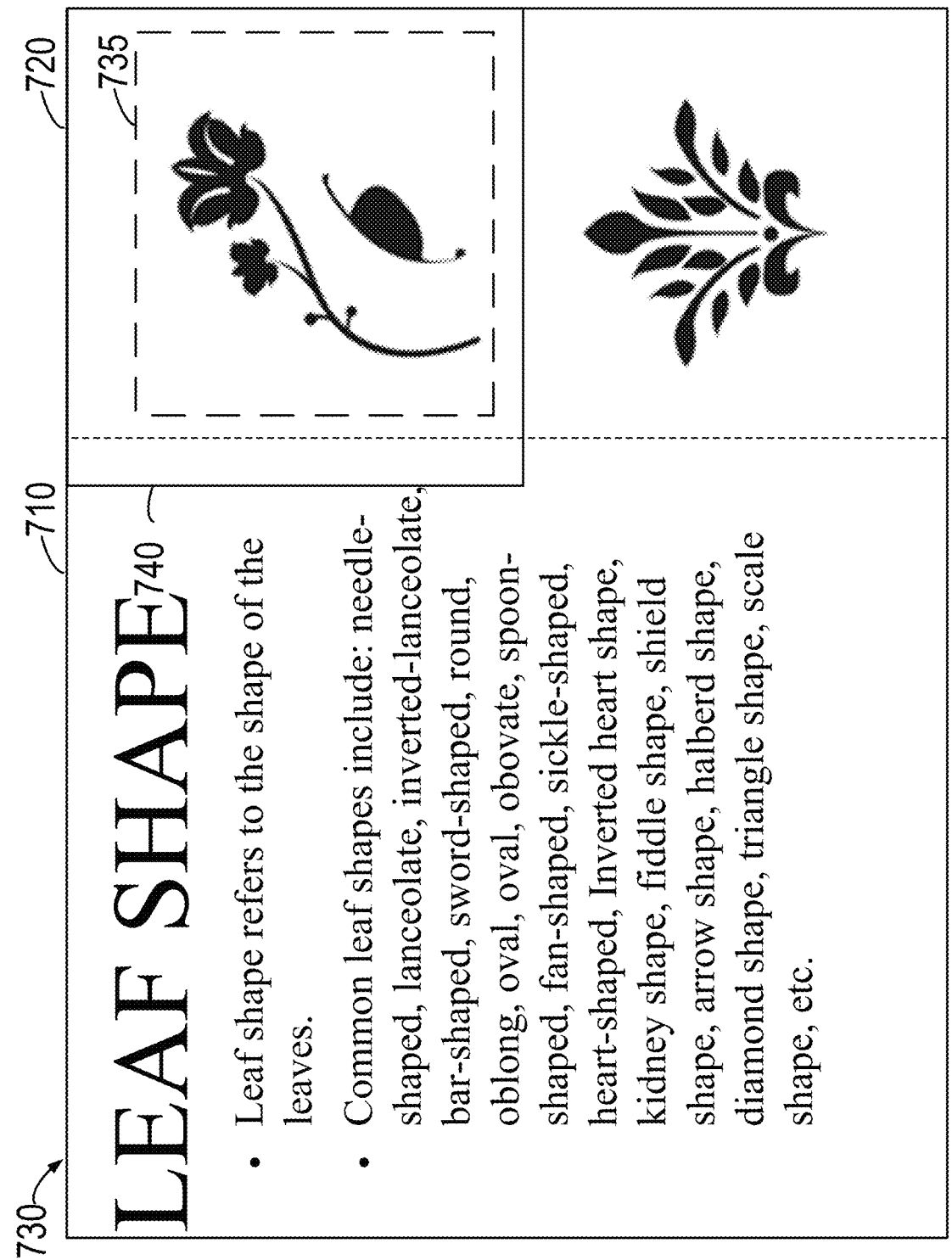

LEAF SHAPE 740

- Leaf shape refers to the shape of the leaves.
- Common leaf shapes include: needle-shaped, lanceolate, inverted-lanceolate, bar-shaped, sword-shaped, round, oblong, oval, oval, obovate, spoon-shaped, fan-shaped, sickle-shaped, heart-shaped, Inverted heart shape, kidney shape, fiddle shape, shield shape, arrow shape, halberd shape, diamond shape, triangle shape, scale shape, etc.

FIG. 7B

REAL-TIME SCREEN SHARING

This application is a U.S. National Stage Application of PCT/IB2018/000626, filed May 24, 2018, which claims benefit of Chinese Patent Application No. 201710471755.3, filed Jun. 20, 2017, which applications are incorporated herein by reference. To the extent appropriate, a claim of priority is made to each of the above disclosed applications.

BACKGROUND

Documents, videos and other digital contents are shared increasingly via the Internet or other networks. Screen sharing is a commonly-used sharing manner, which means that one device (referred to as "a transmitter") re-presents a screen interface on a screen of another device (referred to as "a receiver") in a permissible time latency via the network, and that the receiver has an interface synchronous with the transmitter to view the shared contents. Screen sharing may be applied to many scenarios, such as remote desktop (such as collaboration office, or remote slide show), video conferencing, cloud-based applications (such as cloud gaming) and the like.

Generally, a video-based sharing scheme is employed to implement screen sharing, that is, image frames of video are collected at the transmitter, and then these image frames are transmitted to the receiver to merge into the video. In a video-based sharing solution, the transmitter captures screen content, a video encoder (such as H.264/AVC, H.265/HEVC, VP9, AVS and the like) is used to encode the captured content, and then the encoded content is transmitted to the receiver. The receiver decodes the received encoded contents, and draws or renders the decoded contents on the screen of the receiver. During screen sharing, the contents on the screen of the transmitter are graphically transmitted to the receiver. In some scenarios, the user of the receiver may further control the screen of the transmitter through interaction with the screen of the receiver.

SUMMARY

In accordance with implementations of the subject matter described herein, there are provided a method and apparatus for real time screen sharing. During screen sharing of two devices, if a certain predetermined condition is satisfied for image(s) encoded by a first device and image(s) decoded by a second device, the first device pauses image processing, for example, pausing capturing images, or pausing encoding and transmitting operations after capturing images. If the pause time of pausing processing satisfies a certain length, a parameter (such as a quantization parameter) associated with an image compression ratio is adjusted. After the first device resumes image processing, the adjusted parameter is used to encode a new image captured on the first device. According to implementations of the subject matter described herein, a transmission code rate during the screen sharing is controlled according to the pause time of pausing processing, without estimating or determining a specific network bandwidth or a coding and decoding speed. Accordingly, the implementations of the subject matter described herein can reduce transmission latency of screen sharing, thereby effectively ensuring the user experience during the screen sharing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other features, advantages and aspects of embodiments of the present disclosure will be made more apparent by describing the present disclosure in more detail with reference to figures. In the figures, the same or similar reference signs represent the same or similar elements, wherein:

FIGS. 7A-7D illustrate example graphic user interfaces (GUIs) of a screen for sharing according to an implementation of the subject matter described herein.

DETAILED DESCRIPTION

Figure 1:
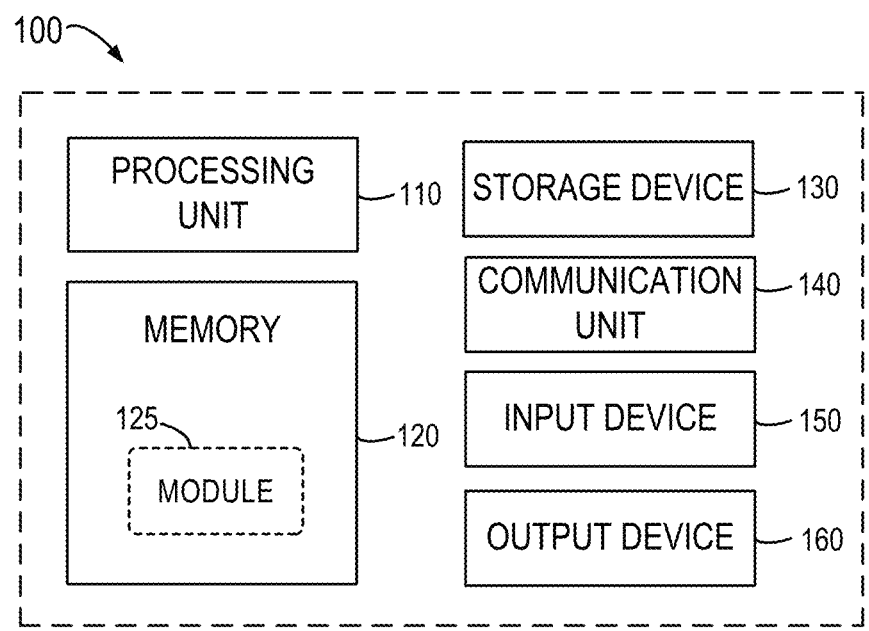
FIG. 1 illustrates a block diagram of a computing device/server in which one or more implementations of the subject matter described herein may be implemented.

Implementations of the present disclosure will be described in more detail below with reference to figures. Although figures show some implementations of the present disclosure, it should be appreciated that the present disclosure may be implemented in many forms and the present disclosure should not be understood as being limited to implementations illustrated herein. On the contrary, these implementations are provided here to enable more thorough and complete understanding of the present disclosure. It should be appreciated that figures and implementations of the present disclosure are only used for exemplary purposes and not used to limit the protection scope of the present disclosure.

As used herein, the term "include" and its variants are to be read as open terms that mean "include, but not limited to." The term "based on" is to be read as "based at least in part on." The term "an implementation" is to be read as "at least one implementation." The term "another implementation" is to be read as "at least one other implementation." The term "some implementations" is to be read as "at least some implementations." Definitions of other terms will be given in the text below.

During the real time screen sharing, a low latency is the most fundamental requirement. Traditionally, to achieve the low latency, it is possible to reduce the amount of transmitted data by decreasing quality of captured image frames, which causes deterioration of image quality. Alternatively, it is possible to reduce the amount of the transmitted data by decreasing the number of image frames captured each second (such as decreasing a frame rate), which causes poor continuity of images and seriously affects the user experience. An improvement for traditional manner is to dynamically adjust a code rate during screen sharing, and dynamically adjust a transmission code rate by measuring latency time of each image (namely, a time period that an image is transmitted from one device to another device). In this way, dynamic adjustment of the transmission code rate can be implemented. However, this improvement manner only considers the latency time of a single image, and is prone to be subject to instant network conditions. Meanwhile, this manner does not take into consideration of a decoding capability of the receiver; however, a poor decoding capability of the receiver also causes the receiver to fail to present the shared screen in time. Therefore, this improvement manner cannot accurately and effectively reduce latency and ensure improvement of image quality.

To this end, the subject matter described herein proposes a method and apparatus for real time screen sharing. During the screen sharing of two devices, if a certain predetermined condition is satisfied between images encoded by the first device and images decoded by the second device, the first device pauses image processing (such as capturing, encoding or transmitting). If the pause time of pausing satisfies a certain length, a parameter (such as a quantitation parameter) associated with an image compression ratio is adjusted. After the first device resumes image processing, the adjusted parameter is used to encode images newly captured on the first device. According to implementations of the subject matter described herein, a transmission code rate during the screen sharing can be controlled according to the pause time of pausing processing, without estimating or determining a specific network bandwidth or a coding and decoding speed. Accordingly, the implementations of the subject matter described here can not only reduce transmission latency of screen sharing, but also ensure image quality of the screen sharing, thereby enhancing the user experience.

In addition, according to implementations of the subject matter described here, the transmission code rate can be controlled more accurately and in a more real-time manner by using factors such as the pause time, latency time and the number of continuous images to dynamically adjust quantization parameter values for determining the compression ratio and transmission code rate of images. In addition, the implementations of the subject matter described here effectively reduce the amount of data to be transmitted by selecting an appropriate codec to encode partially-changed images. Meanwhile, in the case that there are smaller changed areas, multiple codecs are used to encode respective small changed areas, thereby further reducing the amount of data to be transmitted.

Reference is made below to FIG. 1 through FIG. 7 to illustrate basic principles and several example implementations of the subject matter described here. FIG. 1 illustrates a block diagram of a computing device/server 100 in which one or more implementations of the subject matter described herein can be implemented. It would be appreciated that the computing device/server 100 described in FIG. 1 is merely for illustration but not limit the function and scope of implementations of the subject matter described herein in any manner.

As shown in FIG. 1, the computing device/server 100 is in the form of a general-purpose computing device. Components of the computing device/server 100 may include, but not limited to, one or more processor(s) or processing unit(s) 110, a memory 120, a storage device 130, one or more communication unit(s) 140, one or more input device(s) 150, and one or more output device(s) 160. The processing unit 110 can be a physical or virtual processor and perform various processes based on programs stored in the memory 120. In a multiprocessor system, a plurality of processing units may execute computer executable instructions in parallel to improve parallel processing capability of the computing device/server 100.

The computing device/server 100 typically includes various computer storage media. The computer storage media may be any media accessible by the computing device/server 100, including but not limited to, volatile and non-volatile media, or removable and non-removable media. The memory 120 may be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The storage device 130 may be any removable or non-removable media, and may include machine-readable media such as a memory, flash drive, disk, and any other media, which can be used for storing information and/or data and accessed within the computing device/server 100.

The computing device/server 100 may further include additional removable/non-removable or volatile/non-volatile storage media. Although not shown in FIG. 1, a disk drive may be provided for reading and writing from/to a removable and non-volatile disk (such as "a floppy disk"), and a disc drive may be provided for reading and writing from/to a removable non-volatile disc. In such case, each drive is connected to the bus (not shown) via one or more data media interfaces. The memory 120 includes a module 125, which is for example one or more program modules which are configured to perform methods and functions of various implementations described herein.

The communication unit 140 communicates with another computing device via communication media. Additionally, functions of components in the computing device/server 100 can be implemented in a single computing cluster or a plurality of computing machines that are communicated with each other via communication connections. Therefore, the computing device/server 100 can be operated in a networking environment using a logical connection to one or more other servers, network personal computers (PCs), or another network node.

The input device 150 can be one or more input devices such as a mouse, keyboard, tracking ball and the like. The output device 160 can include one or more output devices such as a display, loudspeaker, printer, and the like. The computing device/server 100 can further communicate, via the communication unit 140, with one or more external devices (not shown) such as a storage device or a display device, one or more devices that enable users to interact with the computing device/server 100, or any devices that enable the computing device/server 100 to communicate with one or more other computing devices (for example, a network card, modem, and the like). Such communication can be performed via input/output (I/O) interfaces (not shown).

Figure 2:
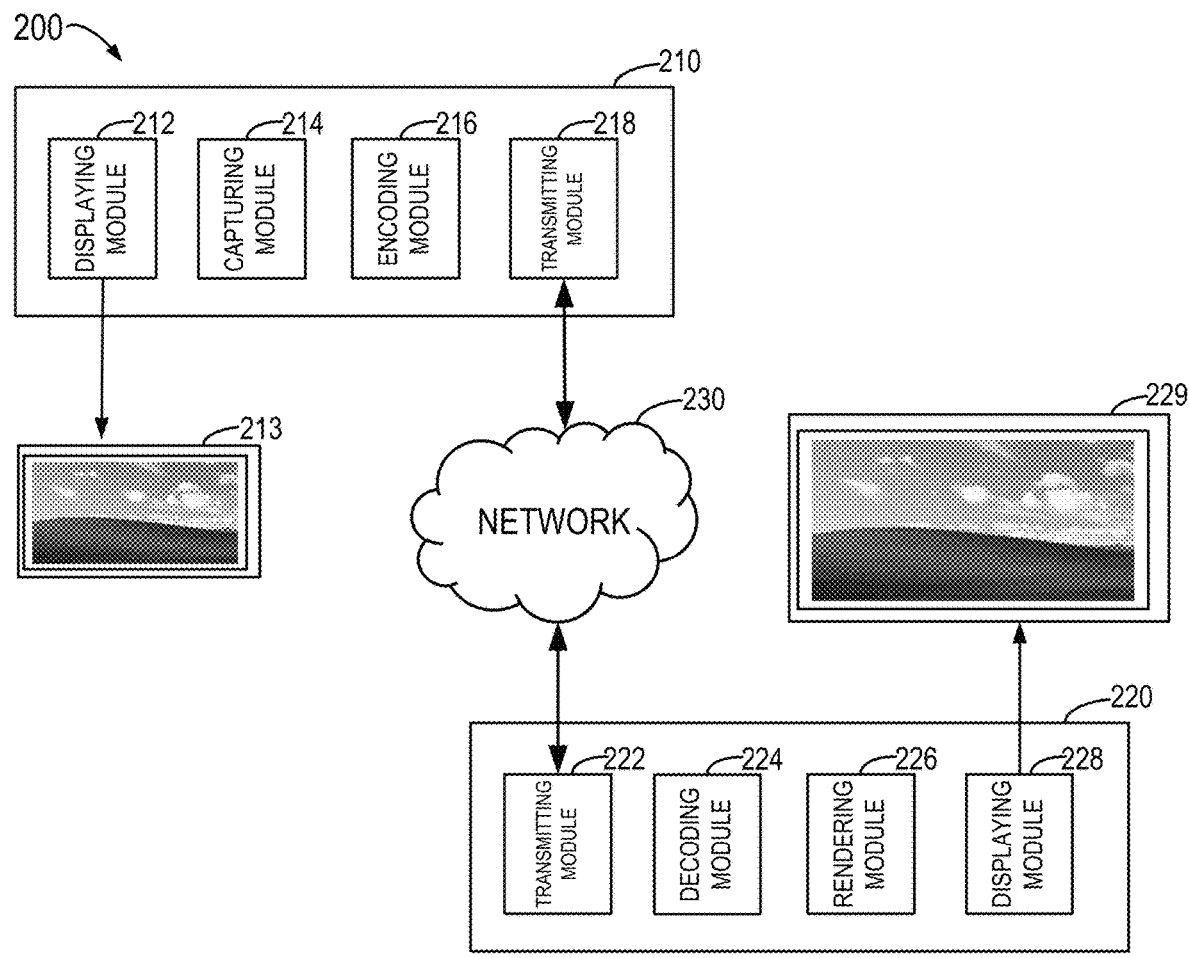
FIG. 2 illustrates a schematic diagram of an example environment in which one or more implementations of the subject matter described herein may be implemented.

FIG. 2 illustrates a schematic diagram of an example environment 200 in which one or more implementations of the subject matter described herein may be implemented. As shown in FIG. 2, the environment 200 comprises a device 210 (also referred to as "a first device") and a device 220 (also referred to as "a second device"), at least one of which may be the computing device/server 100 described with reference to FIG. 1. In fact, the devices 210 and 220 may respectively be any device with the networking, displaying and processing capabilities, for example, a fixed device (such as a desktop computer, server, projector or the like) or a mobile device (such as a portable computer, smart phone, tablet computer or the like). As shown in FIG. 2, the device 210 and device 220 may communicate with each other via a network 230. The network 230 may be any wired and/or wireless network. Optionally, the network comprises but not limited to, Internet, a local area network, a wide area network, a metropolitan area network, a virtual private network (VPN), and a wireless communication network and the like.

In the example shown in FIG. 2, the device 210 may be a sharing end (namely, a transmitter) during the screen sharing, and it may comprise a displaying module 212, a capturing module 214, an encoding module 216 and a transmitting module 218. The display module 212 may display a graphic user interface (GUI) on a screen, for example, GUI 213, and the capturing module 214 may capture images of the screen during screen sharing, for example, capturing a predetermined number of frames per second. The number of frames (that is, a frame rate) captured per second may be set dynamically according to application scenarios. For example, tens of frames may be captured per second for scenarios such as cloud gaming with higher requirements for realistic and real time, while only several frames may be captured per second for ordinary scenarios (e.g., slide show sharing). The encoding module 216 may encode the captured images according to encoding parameters, such as quantization parameters associated with an image compression ratio. Generally, the greater the encoded data is, the higher the image quality is. The transmitting module 218 is configured to transmit encoded images to, for example, the device 220 via the network.

It should be understood that although FIG. 2 only shows four modules of the device 210, the device 210 may further comprise other modules, such as a controlling or processing module, and a color space conversion module. In addition, the encoding module 216 may simultaneously have an encoding capability and a decoding capability, that is, the encoding module 216 may be an encoding and decoding module.

As shown in FIG. 2, the device 220 may be a shared end (namely, a receiver) during screen sharing, and it may comprise a transmitting module 222, a decoding module 224, a rendering module 226 and a displaying module 228. The transmitting module 222 may receive encoded images from the device 210 through the network, and the decoding module 224 may decode the encoded images. The rendering module 226 is used to draw or render the decoded images, and the displaying module 228 is used to display the rendered images, for example displaying GUI 229.

It can be seen that the GUI 229 displayed in the device 220 is a shared screen picture of GUI 213 displayed in the device 210. It should be appreciated that although FIG. 2 only shows four modules of the device 220, the device 220 may further comprise other modules, such as a controlling or processing module, and a reverse color space conversion module. In addition, the decoding module 224 may simultaneously have an encoding capability and a decoding capability, for example, the decoding module 224 may be an encoding and decoding module.

In addition, whenever the decoding module 224 of the device 220 successfully decodes an image, it sends a feedback to the device 210 to inform the device 210 that this image has been received and decoded. Hence, the device 210 always knows that how many images have been encoded, how many images have been sent, and how many decoding feedbacks have been received from the device 220. According to the implementation of the subject matter described herein, if the number of images that have been encoded but not decoded (called "number of queuing images") is too large (for example, the device 210 has encoded and sent 10 images, but the decoding feedbacks of five images are only received), the device 210 will pause processing images for a period of time. For example, the device 210 may pause capturing images or pause encoding and sending operations after capturing images, until it receives more decoding feedbacks.

The Inventor finds after research that there are two major reasons for excessive number of queuing images. The first reason is that the available network bandwidth between the device 210 and device 220 is undesirable, so a longer time period is needed to send the images. In this case, the device 210 needs to pause processing images for a period of time, otherwise too many images to be sent will exist in the transmission channel, rendering the overall latency greater.

The second reason is that the decoding capability of the receiver is poor (such as, the decoding rate is low), for example, the processing capability of the device 220 might be poor. That is, although the device 220 can receive the encoded images from the device 210 in time, it cannot decode these encoded images in real time. Therefore, the device 210 needs to pause processing images for a period of time, otherwise too many images to be decoded will exist at the device 220, which also causes the overall latency heavily.

In the implementations of the subject matter described herein, the term "frame rate" generally refers to the number of images captured or displayed per second. If the frame ratio is greater, the shared video is smooth; while if the frame rate is smaller, the shared video is not smooth. The term "resolution" represents a length and width of an image, namely, the dimension of the image, whereas the term "code rate" represents the amount of data after compression of images captured per second. Code rate control is an important process in the screen sharing. If the code rate is too high, it might cause a high latency and a low frame rate; while if the code rate is lower, an undesirable quality of transmitted images might be caused. Reference is made to FIGS. 3-7 below to describe further details of the code rate control according to the implementations of the subject matter described herein.

Figure 3:
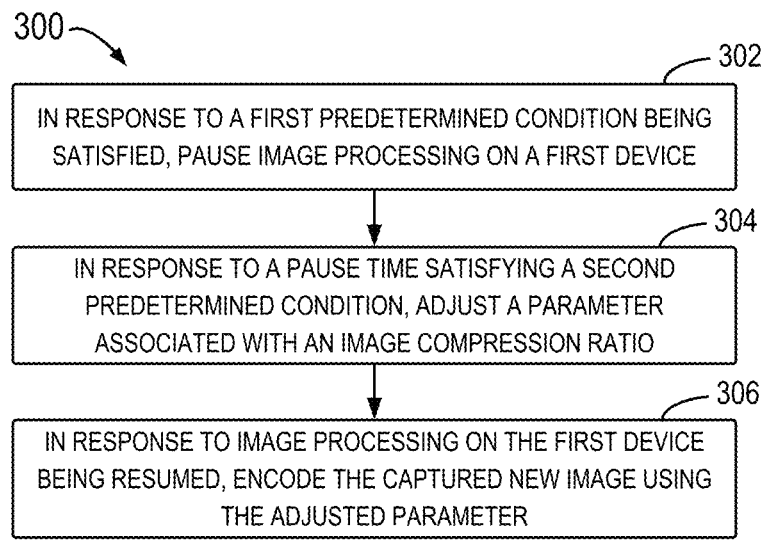
FIG. 3 illustrates a flow chart of a method for real time screen sharing according to an implementation of the subject matter described herein.

FIG. 3 illustrates a flow chart of a method 300 for real time screen sharing according to an implementation of the subject matter described herein. It should be appreciated that the method 300 may be executed by the computing device/server 100 as described with reference to FIG. 1 or the device 210 as described with reference to FIG. 2.

At 302, image processing on the first device is paused in response to a certain predetermined condition (referred to as "a first predetermined condition") being satisfied for image(s) already encoded by the first device (such as the device 210 as shown in FIG. 2) and image(s) already decoded by the second device (such as the device 220 as shown in FIG. 2), wherein the first device shares its screen with the second device.

Generally, the transmitter (such as device 210) records the number of images or amount of data (such as the number of bits) that have been encoded and sent. Furthermore, the transmitter receives the decoding feedbacks from the receiver (such as the device 220). Whenever the receiver receives and successfully decodes the images, it sends a feedback to the transmitter. In some implementations, the first predetermined condition may be that a difference between the number of images already encoded by the transmitter and the number of images already decoded by the receiver is greater than a predetermined number. That is, when too many images have been sent and not yet been decoded, it indicates that the number of the queuing images is excessive, so it is necessary to pause image processing to wait for a period of time. In another implementation, the first predetermined condition may be that the difference between the number of bits of images already encoded by the transmitter and the number of bits of images already decoded by the receiver is greater than a predetermined number of bits. Hereunder, reference is made to FIG. 4 to further describe an example implementation of pausing image processing.

Figure 5:
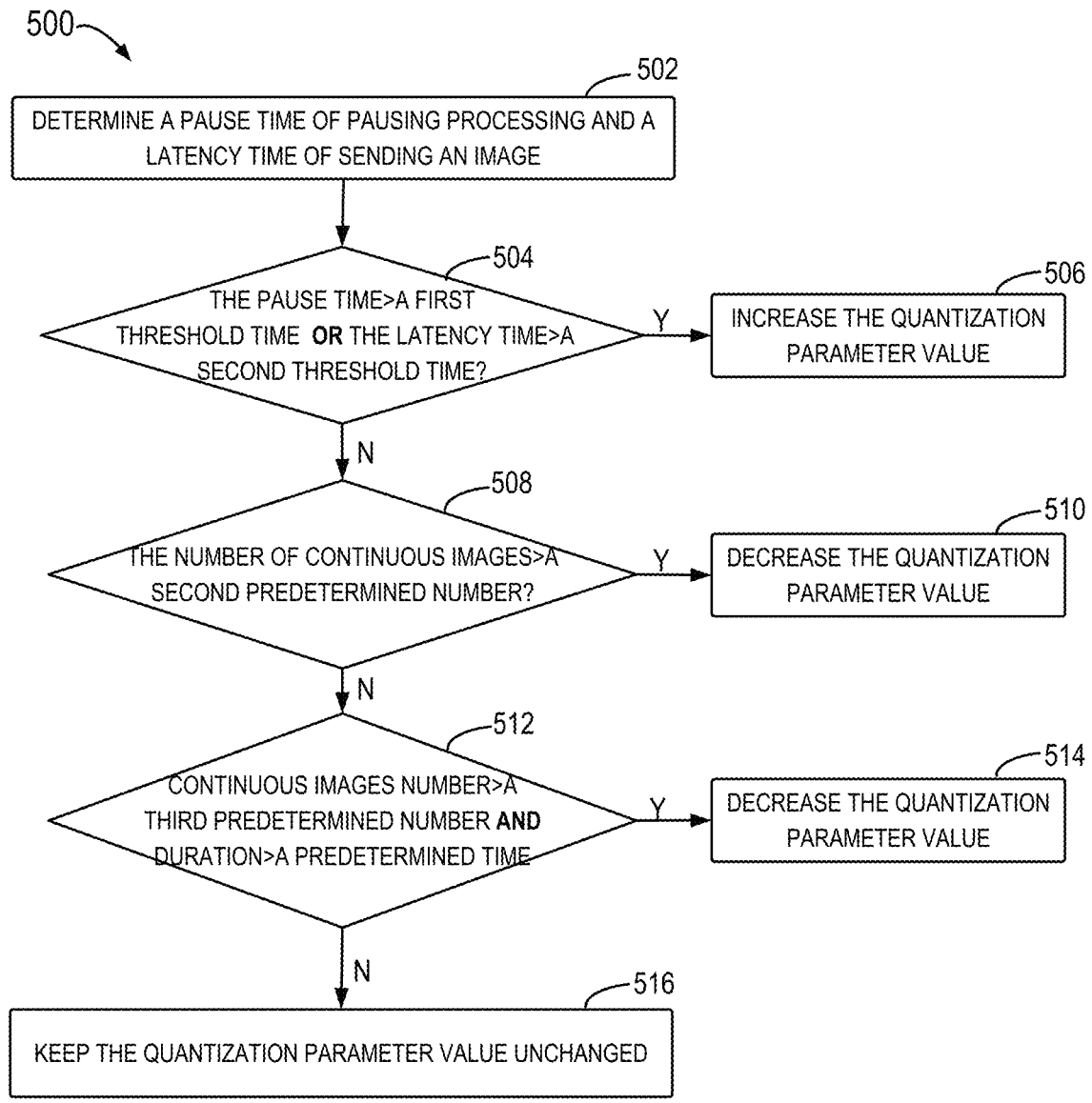
FIG. 5 illustrates a flow chart of a method for adjusting a quantization parameter associated with an image compression ratio according to an implementation of the subject matter described herein.

At 304, a parameter (such as a quantization parameter) associated with an image compression ratio is adjusted in response to a pause time of the pausing satisfies another predetermined condition (referred to as "a second predetermined condition"). The quantization parameter (QP) is a serial number of a quantization step (Qstep). In H.264/AVC and H.265/HEVC, as for 8-bit input image/video, the quantization parameter generally has a value for example in a range of 0-51. The quantization step may be determined based on the quantization parameter value. The quantization step can determine the image compression ratio and the transmission code rate of screen sharing. Generally, if the quantization parameter value increases, images deteriorate in terms of size and quality, and meanwhile the transmission code rate becomes smaller, and vice versa. Reference is made to FIG. 5 below to further describe example embodiments of the quantization parameter.

Figure 6:
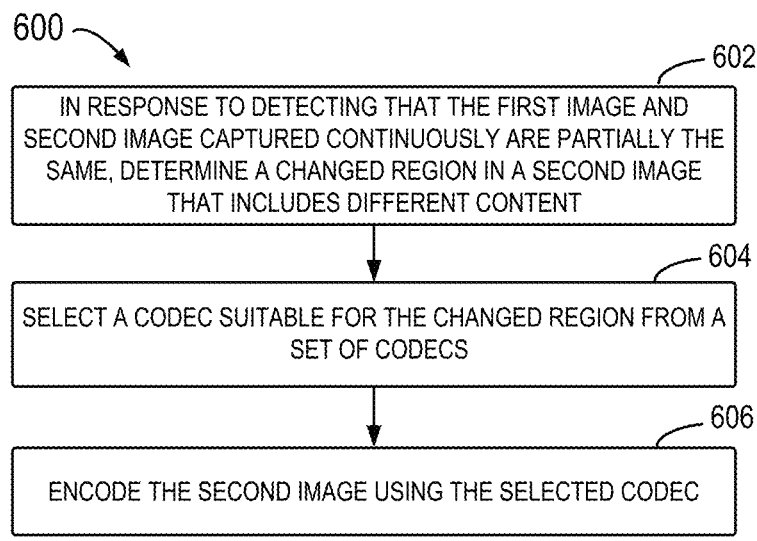
FIG. 6 illustrates a flow chart of a method for sharing a screen based on multiple codecs according to an implementation of the subject matter described herein.

At 306, a new image(s) captured on the first device is encoded using the adjusted parameters, in response to image processing on the first device being resumed. For example, after adjustment of the quantization parameter is completed, when images begin to be captured again, the adjusted quantization parameter is used for encoding. Reference is made to FIG. 6 to further describe an example implementation of encoding images.

Therefore, according to implementations of the method 300 of the subject matter described herein, the transmission code rate during screen sharing is controlled according to the pause time of pausing of image processing, without need to estimate or determine a specific network bandwidth or encoding and/or decoding speed, thereby reducing the latency and effectively ensuring the user experience during screen sharing.

Figure 4:
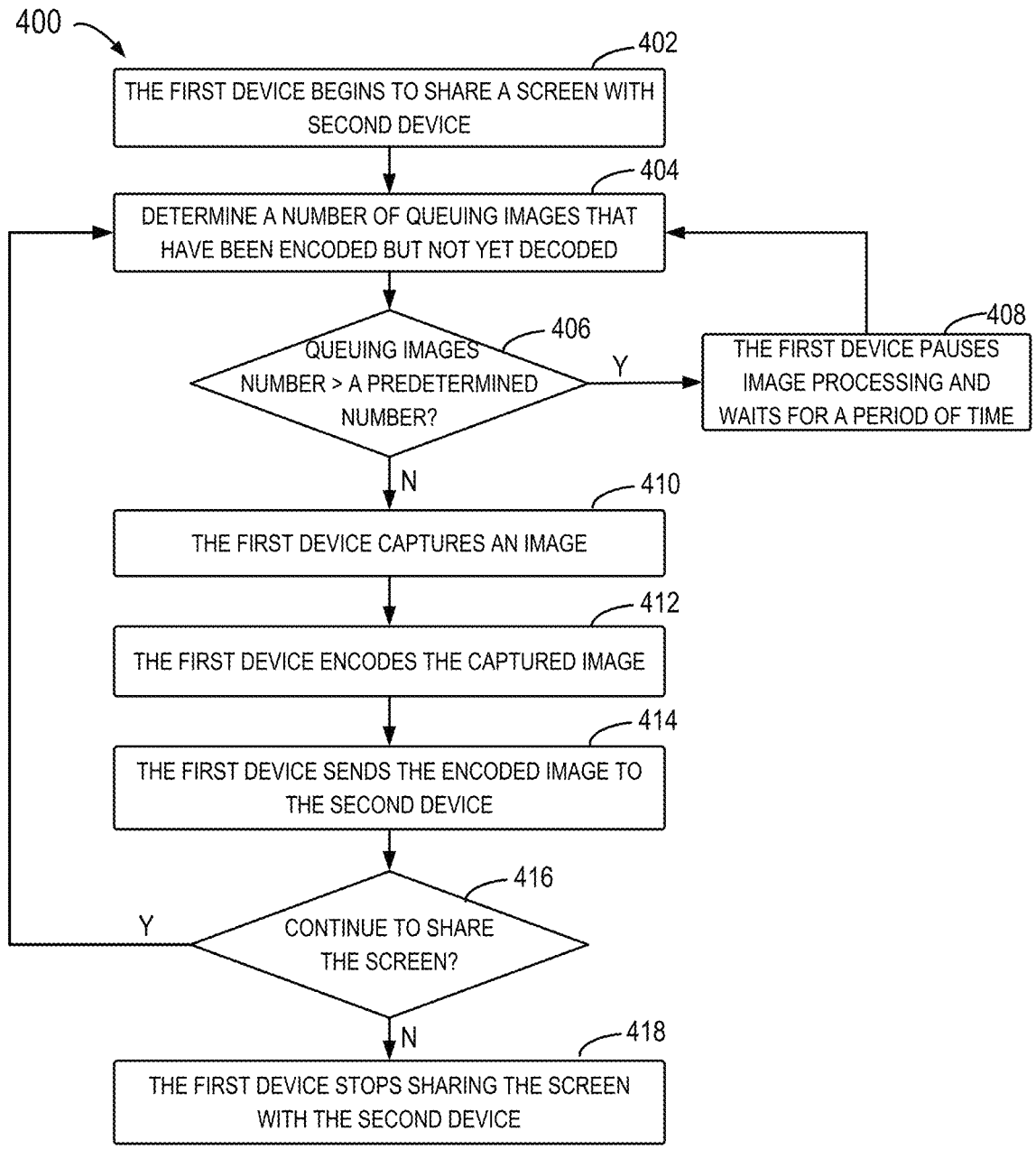
FIG. 4 illustrates a flow chart of a method for controlling screen sharing according to an implementation of the subject matter described herein.

FIG. 4 illustrates a flow chart of a method 400 for controlling screen sharing according to an implementation of the subject matter described herein. It should be appreciated that the method 400 may be executed by the computing device/server 100 as described with reference to FIG. 1 or the device 210 as described with reference to FIG. 2. In addition, actions 402-406 in FIG. 4 may be actions performed before the action in block 302 in FIG. 3, the action 408 may be an example of the action in block 302, and actions 410-418 may be an example of the action in block 306 and subsequent actions.

At 402, the first device (such as the device 210 as shown in FIG. 2) begins to share the screen with the second device (such as the device 200 shown in FIG. 2). At 404, the number of queuing images encoded by the first device but not yet decoded by the second device is determined, and at 406 it is determined whether the number of queuing images is greater than a predetermined number.

If yes, at 408 the first device pauses image processing and waits for a period of time, then the flow returns to block 404 to continue to determine the number of the queuing images. The pausing of image processing ends up until the number of queuing image is less than the predetermined number.

According to implementations of the subject matter described herein, a total duration of the pausing capturing each time is recorded as "pause time" of the pausing capturing each time. If the pause time of the pausing capturing each time is too long, a lower frame rate might be caused so that the video of screen sharing is not smooth and realistic enough.

If the number of queuing images is less than the predetermined number, at 410 the first device continues to capture images, for example, the screen is captured with a fixed number of frames per second, and at 412 the captured images are encodes. At 414, the first device sends the encoded images to the second device. Optionally, it is possible to record the duration for sending each image, and this duration is also referred to as "latency time." At 416, it is determined whether to continue to share the screen. In the case of continuation, the flow returns to block 404 to continue to perform the screen sharing operations; otherwise, at 418 the first device stops sharing screen to the second device.

FIG. 5 illustrates a flow chart of a method 500 for adjusting a quantization parameter associated with an image compression ratio according to an implementation of the subject matter described herein. It should be appreciated that the method 500 may be executed by the computing device/server 100 as described with reference to FIG. 1 or the device 210 as described with reference to FIG. 2. In addition, actions 502-516 in FIG. 5 may be sub-actions of the action in block 304 as described with reference to FIG. 2.

At 502, the pause time of the pausing processing is determined, while the latency time for sending an image is also determined. For example, the pause time of the pausing each time in block 408 as described with reference to FIG. 4 may be determined (if there is no pausing, the pause time may be set as zero by fault), and the latency time for sending the current image in block 414 as described with reference to FIG. 4 may be determined.

At 504, it is determined whether the pause time and latency time exceed a predetermined time respectively. If one or both of the pause time and latency time exceed the predetermined time, it means that the latency of screen sharing is longer. The quantization parameter value may be increased at 506 (such as, increase progressively by 1 each time), and the latency is reduced by decreasing the image quality and decreasing the transmission code rate. In some implementations, it is possible to increase the quantization parameter value in the case of only requiring that the pause time is greater than the threshold time without requiring that the length of the latency time. The increase of the quantization parameter value can cause a lower transmission code rate and a lower image quality, a lower transmission code rate can not only ease the latency caused by insufficient network bandwidth, but also quicken the decoding speed of the receiver, thereby ensuring the frame rate and decreasing the latency simultaneously.

If none of the pause time and latency time exceeds a predetermined time thereof, it indicates that the current latency of the screen sharing is very small, and thoughts may be given to whether to improve the image quality, namely, decreasing the quantization parameter value. At 508, it is determined whether the number of images continuously sent in the case that none of the pause time and latency time exceeds the predetermined time thereof (referred to as "a third number") is greater than a predetermined number (referred to as "a second predetermined number"). If the number of images continuously sent is greater than the second predetermined number, the quantization parameter value is decreased (such as, decrease progressively by 1 each time) at 510.

If the number of images continuously sent is less than the second predetermined number, at 512 it is determined whether the number of images continuously sent is greater than another predetermined number (referred to as "a third predetermined number", whose value is less than the second predetermined number), and meanwhile it is determined whether a duration elapsed since previous increase of the quantization parameter value is large than the predetermined time. If the condition in block 512 is satisfied, the quantization parameter value is decreased (such as, decrease progressively by 1 each time) at 514; otherwise, the quantization parameter value remains unchanged. It should be appreciated that although in FIG. 5, the action 508 is shown before the action 512, the action 508 may be executed after the action 512 or both of them are executed substantially simultaneously.

In some cases, an upper limit value and a lower limit value for the quantization parameter value may be set, and the quantization parameter value will not be adjusted upon reaching the upper limit value or lower limit value, thereby ensuring the adjusted quantization parameter value always in a reasonable scope. Therefore, according to the method 500 of the subject matter described herein, the pause time, latency time, the number of images sent continuously and the duration are used to dynamically adjust the quantization parameter value for determining the image compression ratio and the transmission code rate, so that the code rate adjustment is made more accurate and in real time, thereby effectively enhancing the user experience of the screen sharing.

FIG. 6 illustrates a flow chart of a method 600 for sharing a screen based on multiple codecs according to an implementation of the subject matter described herein. It should be appreciated that the method 600 may be executed by the computing device/server 100 as described with reference to FIG. 1 or the device 210 as described with reference to FIG. 2. In addition, actions 602-606 in FIG. 6 may be sub-actions of the action 306 as described with reference to FIG. 2.

At 602, a region of variation in a second image that includes content different from a first image is determined in response to detecting that the first image and second image captured continuously on the first device (such as, device 210 described in FIG. 2) are partially the same. For example, in some scenarios, only a portion in the screen varies with time, and other portions in the screen remains unchanged. At this time, only the region of variation needs to be encoded, and the region of non-variation does not need to be encoded or sent.

For example, when a video is played in a browser, contents in the video play region change while other portions in the screen remain unchanged. In some implementations, in the case that the network bandwidth is insufficient, it is possible to increase the quantization parameter value of the region of variation and meanwhile not to change or decrease the quantization parameter values of region of non-variation, so that the image quality of only region of variation worsens and image quality of regions of non-variation does not change or becomes better. For example, if a predetermined number of continuous images in the region of non-variation do not change, the quantization parameter value for region of non-variation may be decrease (such as decrease progressively by 1).

Those skilled in the art should appreciate that when the network bandwidth condition and image encoding quality are not good enough, the region of variation in the screen does not need to be detected, thereby reducing computing complexity during the screen sharing.

In some implementations, the screen may be divided into a plurality of blocks (for example, each block is sized 16×16), and then the difference between blocks may be detected for each block by comparing pixel by pixel or by comparing sub-sampled pixels. In some other implementations, it is possible to compare the difference between images through "dirty region" information provided by the operating system, and the "dirty region" refers to a region in the screen except which content remains unchanged. In a further implementation, it is possible to use the "dirty region" information provided by the operating system to perform a preliminary comparison, then the "dirty region" is further determined by comparing pixel by pixel, to extract a more accurate region of variation.

At 604, a codec suitable for the region of variation is selected from a set of codecs, and the set of codecs includes multiple codecs having different encoding and/or decoding sizes. For example, a codec corresponding to a minimum encoded region that can cover the region of non-variation is selected. In some implementations, the set of codecs may predefine multiple codecs for different region sizes. For example, the multiple codecs in the set of codecs may respectively correspond to full screen encoding and decoding, quarter screen encoding and decoding, one-sixteenth screen encoding and decoding, and encoding and decoding of a fixed minimum region (such as, 256×256 pixels, if the region is less than the size of one-sixteenth screen). For another example, the multiple codecs in the set of codecs may further respectively correspond to full screen encoding and decoding, left half screen encoding and decoding, right half screen encoding and decoding, quarter screen encoding and decoding, and the like. It should be appreciated that the multiple codecs according to implementations of the subject matter described here may be preset to encode and decode with respect to regions of various sizes.

In some implementations, assume that the size of the screen is w×h pixels, wherein w represents the number of pixels in the width of the screen, while h represents the number of pixels in the height of the screen. The first codec in the set of codecs may be set with respect to the size of w×h, and it is used encode the whole screen. The second codec in the set of codecs may be set with respect to the size of w/2×h/2, the third codec may be set with respect to the size of w/4×h/4, and the fourth codec may be set with respect to the size of 256×256 pixels (in the case that the size of the third codec is greater than the size of the fourth codec). In some implementations, the transmitter may select the codec having a resolution of multiples of 16.

At 606, the selected codec is used to encode the second image. It is necessary to record encoded region information, and the encoded region information includes a starting position and a size of the encoded region of the selected codec. Then, during transmission, the encoded second image and encoded region information are sent from the first device to the second device. In this way, the second device only receives and decodes image data for the encoded region, and the received images are decoded and rendered according to the encoded region information, thereby decreasing the amount of data transmitted during the screen sharing.

In some implementations, in the case that the sizes of the encoded regions of the codecs of the first image and second image are the same, if the encoded region of the first image can cover the region of variation, the encoded region information for the first image is used as the encoded region information for the second image; otherwise, the encoded region information for the second image is determined based on the region of variation. For example, the region of variation may be placed at a middle position of the encoded region. In some implementations, the codec may determine the encoded region information by selecting a suitable starting position (such as a position at a left upper corner of the matrix encoded region).

Optionally, when the screen includes multiple small sub-regions of variation, these small sub-regions of variation may be merged into a large region of variation. Alternatively, in the screen sharing scenario such as document input, only an input cursor position and a digit statistics position in the screen might change. Thus, encoding may be performed respectively for the multiple small sub-regions of variation instead of merging these small sub-regions of variation into a single greater region of variation. For example, it is possible to extract multiple sub-regions of variation in the region of variation so that other regions in the region of variation except the multiple sub-regions of variation do not change, and a sum of multiple sub-encoded regions respectively for the multiple sub-regions of variation may be determined. If the sum of the multiple sub-encoded regions is less than a predetermined proportion (such as 50 percent) of the encoded region for the region of variation, the multiple codecs respectively for the multiple sub-regions of variation are used to encode the images.

Therefore, according to the implementation of the method 600 of the subject matter described here, in the case that continuous images only change partially, since suitable codecs are employed to encode partial regions in the image, it is possible to reduce pre-processing time (such as color space conversion time), encoding time, transmission time, decoding time, post-processing time (such as reverse color space conversion time), rendering time and the like.

FIGS. 7A-7D illustrate example graphic user interfaces (GUIs) 700, 730, 750 and 780 of a screen for sharing according to implementations of the subject matter described herein. It should be appreciated that FIGS. 7A-7D are only presented as examples of the implementations of the subject matter described herein, and are not to limit the scope of protection of the subject matter described herein.

FIG. 7A illustrates an example GUI 700 of a screen for sharing according to an implementation of the subject matter described herein. For example, the device 210 shares the slide in the screen with the device 220, which is a text description and graphic introduction of leaf shape, and the left portion of the GUI 710 is the text region 710, while the right portion is the graphic region. The GUI 730 as shown in FIG. 7B is an example image captured at next moment, wherein an upper graph in the graphic region 720 changes, and the remaining region does not change, and thus it may be determined that the region of variation of the GUI 730 relative to the GUI 700 is the region of variation 735. Assume that the minimum encoded region that can cover the region of variation 735 is the encoded region 740, the codec corresponding to the encoded region 740 is used to encode only image content in the encoded region 740 in GUI 730.

Figure 7C:
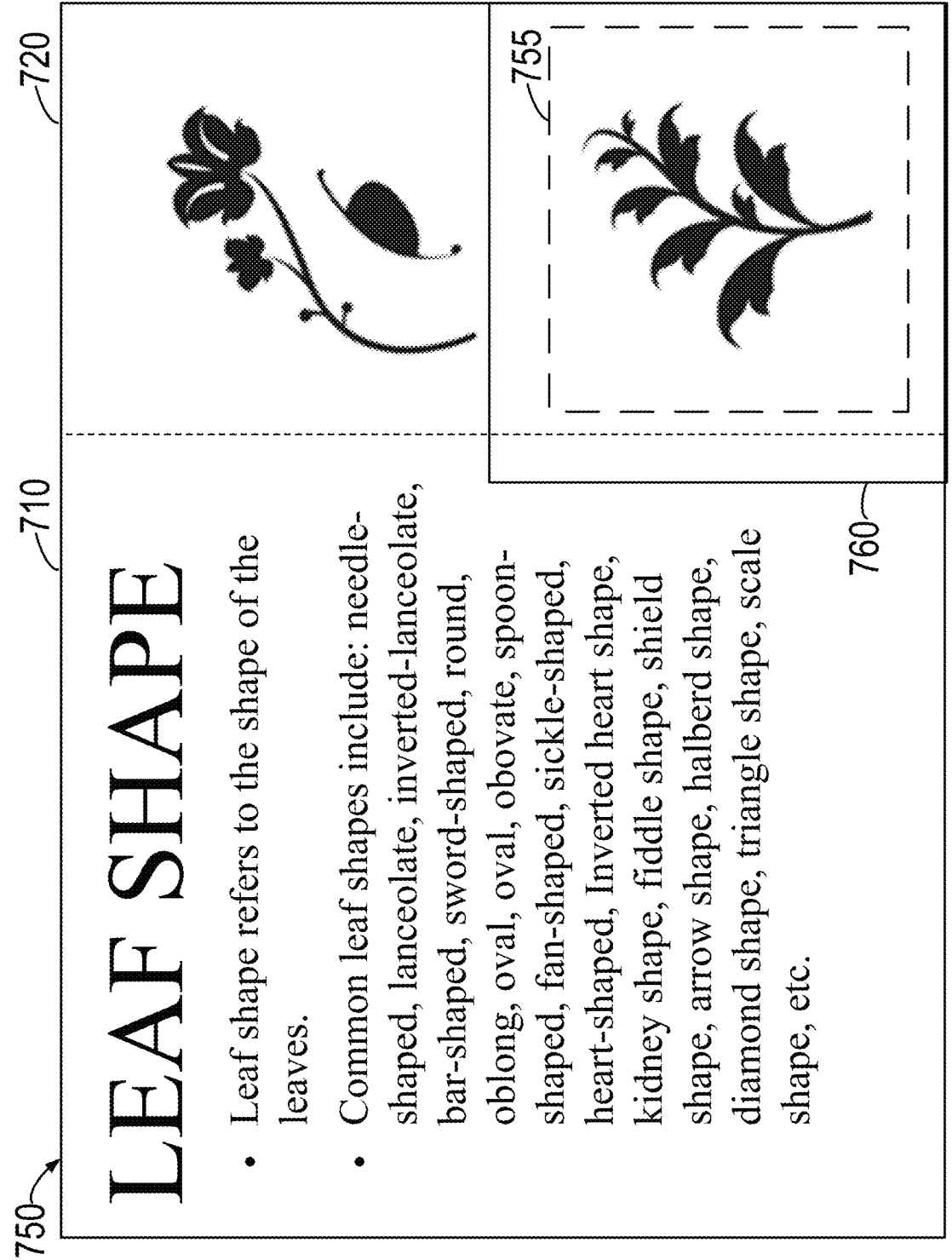

GUI 750 as shown in FIG. 7C is an image capture at next moment, wherein a lower picture in the graphical region 720 changes, and the remaining region does not change, and thus it may be determined that the region of non-variation of GUI 760 relative to the GUI 730 is the region of variation 755. Assume that the minimum encoded region that can cover the region of variation 755 is the encoded region 760, the codec corresponding to the encoded region 760 is used to encode only image content in the encoded region 760 in GUI 730. As shown in FIG. 7C, since the encoded region 740 at previous moment cannot cover the current region of variation 755, a new encoded region 760 is re-determined.

Figure 7D:
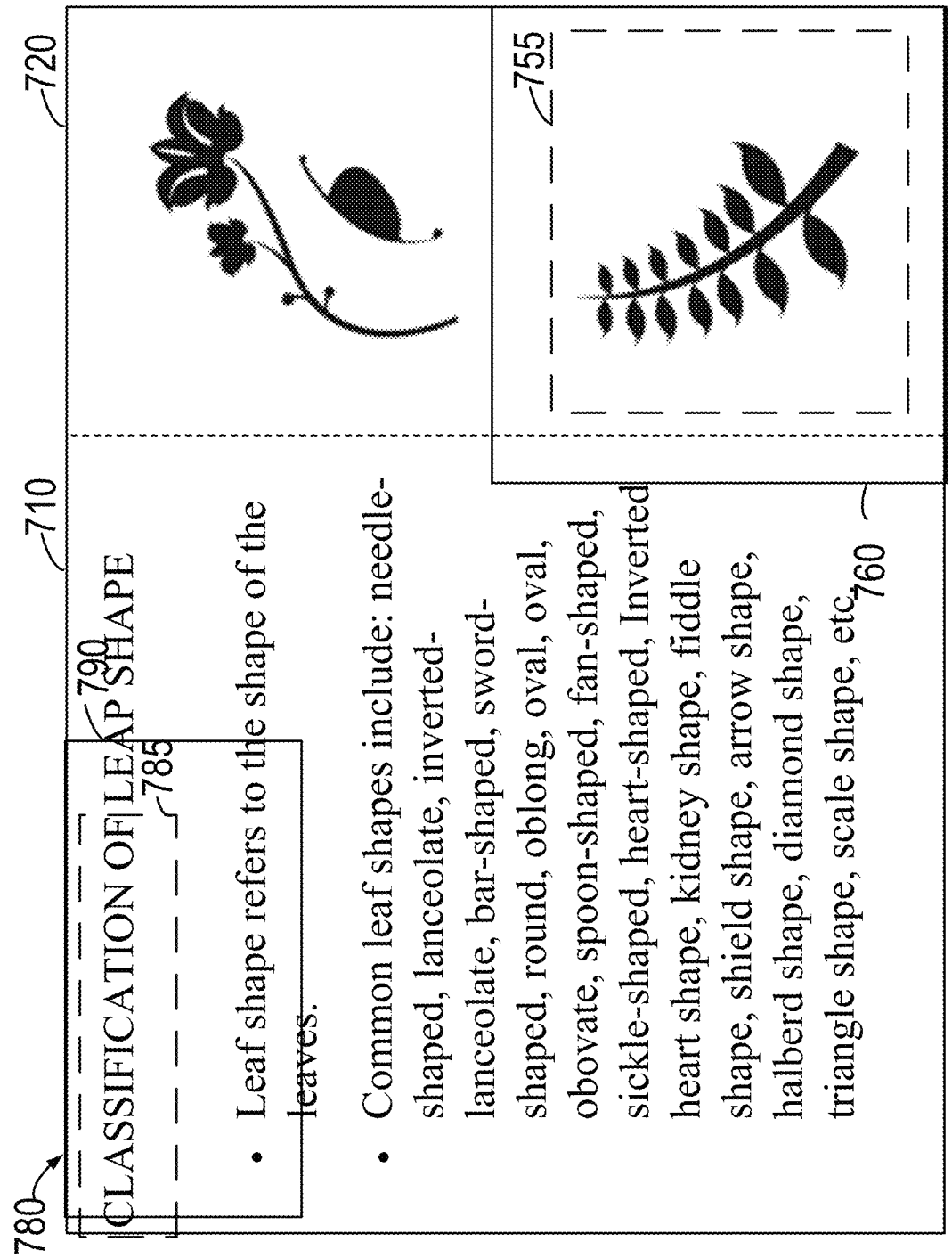

GUI 780 as shown in FIG. 7D is an image capture at next moment, wherein the lower picture in the graphical region 720 changes, and the remaining region in the graphical region 720 does not change. Since the encoded region 760 at previous moment can cover the current region of variation 755, the encoded region 760 is still used. In addition, in GUI 780, partial text in the text region 710 also changes and therefore further comprises another region of variation 785, and a minimum encoded region that can cover the region of variation 785 is for example the encoded region 790.

In FIG. 7D, although contents in only two small regions changes, namely, regions of variation 755 and 785, they are far away from each other. If one encoded region is used for encoding, the whole screen needs to be encoded. If an encoded region is respectively selected for small regions of variation, only encoded regions 760 and 790 are needed, and the sum thereof is less than a half of the whole screen. Therefore, according to the implementation of the subject matter described herein, it is possible to use two codecs with different sizes to encode respectively for two sub-encoded regions (such as encoded regions 760 and 790), thereby further reducing the amount of data to be transmitted.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In addition, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Some example implementations of the subject matter described herein are listed below.

In one aspect, there is provided a method. The method comprises: in response to a first predetermined condition being satisfied for an image encoded by a first device and an image decoded by a second device, pausing image processing on the first device, the first device shares a screen with the second device, and the processing includes one or more of capturing, encoding and sending of an image; in response to a pause time of the pausing satisfying a second predetermined condition, adjusting a parameter associated with an image compression ratio; and in response to image processing on the first device being resumed, encoding a new image captured on the first device using the adjusted parameter.

In some implementations, wherein the first predetermined condition comprises: a difference between a first number of images encoded by the first device and a second number of images decoded by the second device is greater than a predetermined number; or a difference between a first number of bits of images encoded by the first device and a second number of bits of images decoded by the second device is greater than a predetermined number of bits.

In some implementations, wherein the parameter is a quantization parameter, and the adjusting a parameter associated with an image compression ratio comprises: in response to a pause time being greater than a predetermined pause time, increasing a value of the quantization parameter.

In some implementations, wherein the adjusting a parameter associated with an image compression ratio further comprises: determining a latency time during which a specific image is sent from the first device to the second device; and in response to the pause time being less than the predetermined pause time, the latency time being less than a predetermined latency time, and a third predetermined condition being satisfied, decreasing the quantization parameter value.

In some implementations, wherein the predetermined number is a first predetermined number, and the decreasing the quantization parameter value comprises: determining a third number of images which are sent while the pause time is less than the predetermined pause time and the latency time is less than the predetermined latency time; and in response to the third number being greater than a second predetermined number, decreasing the quantization parameter value.

In some implementations, wherein the decreasing the quantization parameter value further comprises: in response to the third number being less than the second predetermined number and being greater than a third predetermined number: determining a time length elapsed since a previous increase of the quantization parameter value; and in response to the time length satisfying a predetermined threshold, decreasing the quantization parameter value.

In some implementations, wherein the encoding a new image captured on the first device using the adjusted parameter comprises: in response to detecting that the first image and second image captured continuously on the first device are partially the same, determining a region of variation in a second image that includes content different from a first image; selecting a codec suitable for the region of variation from a set of codecs, the set of codecs includes multiple codecs having different encoding and decoding dimensions; and encoding the second image using the selected codec.

In some implementations, the method further comprises: sending the encoded second image and encoded region information from the first device to the second device, the encoded region information includes a starting position and a size of the encoded region of the selected codec.

In some implementations, the method further comprises: in response to sizes of encoded regions of the codecs of the first image and second image being the same: in response to the encoded region of the first image being capable of covering the region of variation, using the encoded region information for the first image as the encoded region information for the second image; and in response to the encoded region of the first image being incapable of covering the region of variation, determining the encoded region information for the second image based on the region of variation.

In some implementations, wherein the encoding the second image using the selected codec comprises: extracting multiple sub-regions of variation in the region of variation so that other region in the region of variation except the multiple sub-regions of variation does not change; determining a sum of multiple sub-encoded regions for the multiple sub-regions of variation; and in response to the sum of the multiple sub-encoded regions being less than a predetermined proportion of the encoded region for the region of variation, encoding the second image using the multiple codecs for the multiple sub-regions of variation.

In some implementations, there is provided an electronic device. The electronic device comprises: a processing unit; and a memory coupled to the processing unit and storing instructions thereon, the instructions, when executed by the processing unit, perform acts including: in response to a first predetermined condition being satisfied for an image encoded by an electronic device and an image decoded by another electronic device, pausing image processing on the electronic device, the electronic device shares a screen with the other electronic device, the processing includes one or more of capturing, encoding and sending of an image; in response to a pause time of the pausing satisfying a second predetermined condition, adjusting a parameter associated with an image compression ratio; and in response to image processing on the electronic device being resumed, encoding a new image captured on the electronic device using the adjusted parameter.

In some implementations, wherein the first predetermined condition comprises: a difference between a first number of images encoded by the electronic device and a second number of images decoded by the other electronic device is greater than a predetermined number; or a difference between a first number of bits of images encoded by the electronic device and a second number of bits of images decoded by the other electronic device is greater than a predetermined number of bits.

In some implementations, wherein the parameter is a quantization parameter, and the adjusting a parameter associated with an image compression ratio comprises: in response to the pause time being greater than a predetermined pause time, increasing a value of the quantization parameter.

In some implementations, wherein the adjusting a parameter associated with an image compression ratio further comprises: determining a latency time during which a specific image is sent from the electronic device to the other electronic device; and in response to the pause time being less than a predetermined pause time, the latency time being less than a predetermined latency time, and a third predetermined condition being satisfied, decreasing the quantization parameter value.

In some implementations, wherein the predetermined number is a first predetermined number, and the decreasing the quantization parameter value comprises: determining a third number of images which are sent while the pause time is less than the predetermined pause time and the latency time is less than the predetermined latency time; and in response to the third number being greater than a second predetermined number, decreasing the quantization parameter value.

In some implementations, wherein the decreasing the quantization parameter value further comprises: in response to the third number being less than the second predetermined number and being greater than a third predetermined number: determining a time length elapsed since a previous increase of the quantization parameter value; and in response to the time length satisfying a predetermined threshold, decreasing the quantization parameter value.

In some implementations, wherein the encoding a new image captured on the electronic device using the adjusted parameter comprises: in response to detecting that the first image and second image captured continuously on the electronic device are partially the same, determining a region of variation in a second image that includes content different from a first image; selecting a codec suitable for the region of variation from a set of codecs, the set of codecs includes multiple codecs having different encoding and decoding dimensions; and encoding the second image using the selected codec.

In some implementations, the acts further comprise: sending the encoded second image and encoded region information from the electronic device to the other electronic device, the encoded region information including a starting position and a size of the encoded region of the selected codec.

In some implementations, the acts further comprise: in response to sizes of encoded regions of the codecs of the first image and second image being the same: in response to the encoded region of the first image being capable of covering the region of variation, using the encoded region information for the first image as the encoded region information for the second image; and in response to the encoded region of the first image being incapable of covering the region of variation, determining the encoded region information for the second image based on the region of variation.

In some implementations, wherein the encoding the second image using the selected codec comprises: extracting multiple sub-regions of variation in the region of variation so that other region in the region of variation except the multiple sub-regions of variation does not change; determining a sum of multiple sub-encoded regions for the multiple sub-regions of variation; and in response to the sum of the multiple sub-encoded regions being less than a predetermined proportion of the encoded region for the region of variation, encoding the second image using the multiple codecs for the multiple sub-regions of variation.

In some implementations, there is provided a computer program product. The computer program product is stored in a computer storage medium and comprises machine-executable instructions which, when executed on a device, cause the device to: in response to a first predetermined condition being satisfied for an image encoded by a first device and an image decoded by a second device, pause image processing on the first device, the first device shares the screen with the second device, the processing includes one or more of capturing, encoding and sending of an image; in response to a pause time of the pausing satisfying a second predetermined condition, adjust a parameter associated with an image compression ratio; and in response to image processing on the first device being resumed, encode a new image captured on the first device use the adjusted parameter.

In some implementations, wherein the first predetermined condition comprises: a difference between a first number of images encoded by the first device and a second number of images decoded by the second device is greater than a predetermined number; or a difference between a first number of bits of images encoded by the first device and a second number of bits of images decoded by the second device is greater than a predetermined number of bits.

In some implementations, wherein the parameter is a quantization parameter, and the adjusting a parameter associated with an image compression ratio comprises: in response to the pause time being greater than a predetermined pause time, increasing a value of the quantization parameter.

In some implementations, wherein the adjusting a parameter associated with an image compression ratio further comprises: determining a latency time during which a specific image is sent from the first device to the second device; and in response to the pause time being less than the predetermined pause time, the latency time being less than a predetermined latency time, and a third predetermined condition being satisfied, decreasing the quantization parameter value.

In some implementations, wherein the predetermined number is a first predetermined number, and the decreasing the quantization parameter value comprises: determining a third number of images which are sent while the pause time is less than the predetermined pause time and the latency time is less than the predetermined latency time; and in response to the third number being greater than a second predetermined number, decreasing the quantization parameter value.

In some implementations, wherein the decreasing the quantization parameter value further comprises: in response to the third number being less than the second predetermined number and being greater than a third predetermined number: determining a time length elapsed since a previous increase of the quantization parameter value; and in response to the time length satisfying a predetermined threshold, decreasing the quantization parameter value.

In some implementations, wherein the encoding a new image captured on the first device using the adjusted parameter comprises: in response to detecting that the first image and second image captured continuously on the first device are partially the same, determining a region of variation in a second image that includes content different from a first image; selecting a codec suitable for the region of variation from a set of codecs, the set of codecs includes multiple codecs having different encoding and decoding dimensions; and encoding the second image using the selected codec.

In some implementations, the machine-executable instructions, when executed on a device, further cause the device to: send the encoded second image and encoded region information from the first device to the second device, the encoded region information includes a starting position and a size of the encoded region of the selected codec.

In some implementations, the machine-executable instructions, when executed on a device, further cause the device to: in response to sizes of encoded regions of the codecs of the first image and second image being the same: in response to the encoded region of the first image being capable of covering the region of variation, use the encoded region information for the first image as the encoded region information for the second image; and in response to the encoded region of the first image being incapable of covering the region of variation, determine the encoded region information for the second image based on the region of variation.

In some implementations, wherein the encoding the second image using the selected codec comprises: extracting multiple sub-regions of variation in the region of variation so that other region in the region of variation except the multiple sub-regions of variation does not change; determining a sum of multiple sub-encoded regions for the multiple sub-regions of variation; and in response to the sum of the multiple sub-encoded regions being less than a predetermined proportion of the encoded region for the region of variation, encoding the second image using the multiple codecs for the multiple sub-regions of variation.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A method comprising:
    determining a first condition being satisfied for an image encoded by a first device and an image decoded by a second device, wherein the first condition comprises at least one of:
        a difference between a first number of images already encoded by the first device and a second number of images already decoded by the second device is greater than a threshold number; or
        a difference between a first number of bits of images already encoded by the first device and a second number of bits of images already decoded by the second device is greater than a threshold number of bits;
    pausing image processing on the first device in response to the first condition being satisfied, the first device sharing a screen with the second device, the processing including one or more of capturing, encoding, sending of an image;
    determining a pause time of the pausing satisfying a second condition;
    adjusting a quantization parameter associated with an image compression ratio in response to the pause time satisfying the second condition;
    determining the image processing on the first device being resumed; and
    encoding a new image captured on the first device using the adjusted quantization parameter in response to the image processing on the first device being resumed.

2. The method according to claim 1, wherein adjusting a quantization parameter associated with an image compression ratio comprises:
    determining the pause time being greater than a threshold pause time; and
    increasing a value of the quantization parameter.

3. The method according to claim 1, wherein the adjusting a quantization parameter associated with an image compression ratio comprises:
    determining a latency time during which a specific image is sent from the first device to the second device;
    determining the pause time being less than a threshold pause time;
    determining the latency time being less than a threshold latency time;
    determining a third condition being satisfied; and
    decreasing a value of the quantization parameter.

4. The method according to claim 1, further comprising decreasing a value of the quantization parameter, wherein decreasing the value of the quantization parameter comprises:
    determining a number of images which are sent while the pause time is less than a threshold pause time and a latency time is less than a threshold latency time;
    determining the number of images being greater than a threshold number; and
    decreasing a value of the quantization parameter.

5. The method according to claim 1, further comprising decreasing a value of the quantization parameter, wherein decreasing the value of the quantization parameter comprises:
    determining a number of images which are sent while the pause time is less than a threshold pause time and a latency time is less than a threshold latency time;
    determining the number of images being less than a first threshold number and being greater than a second threshold number;
    determining a time length elapsed since a previous increase of a value of the quantization parameter;
    determining the time length satisfying a threshold time length; and
    decreasing the value of the quantization parameter.

6. The method according to claim 1, wherein the encoding a new image captured on the first device using the adjusted quantization parameter comprises:
    detecting that a first image and a second image captured continuously on the first device are partially the same;
    determining a region of variation in the second image that includes content different from the first image;
    selecting a codec suitable for the region of variation from a set of codecs, the set of codecs including a plurality of codecs having different encoding and decoding sizes; and
    encoding the second image using the selected codec.

7. The method according to claim 6, further comprising:
    sending the encoded second image and encoded region information from the first device to the second device, the encoded region information including a starting position and a size of an encoded region of the selected codec.

8. The method according to claim 6, further comprising:
    determining sizes of encoded regions of the codecs of the first and second image being same;
    determining an encoded region of the first image being capable of covering the region of variation;
    using encoded region information for the first image as encoded region information for the second image;

determining the encoded region of the first image being incapable of covering the region of variation; and determining the encoded region information for the second image based on the region of variation.

9. The method according to claim 6, wherein the encoding the second image using the selected codec comprises:

extracting a plurality of sub-regions of variation in the region of variation so that other region in the region of variation except the plurality of sub-regions of variation does not change;

determining a sum of a plurality of sub-encoded regions for the plurality of sub-regions of variation;

determining the sum of the plurality of sub-encoded regions being less than a threshold proportion of the encoded region for the region of variation; and encoding the second image using the plurality of codecs for the plurality of sub-regions of variation.

10. An electronic device, comprising:

a processing unit; and a memory coupled to the processing unit and storing instructions, the instructions, when executed by the processing unit, performing acts including:

in response to a first predetermined condition being satisfied for an image encoded by the electronic device and an image decoded by another electronic device, pausing image processing on the electronic device, the electronic device sharing a screen with the other electronic device, the processing including one or more of capturing, encoding and sending of an image;

in response to a pause time of the pausing satisfying a second predetermined condition, adjusting a quantization parameter associated with an image compression ratio including:

determining a latency time during which a specific image is sent from the electronic device to the other electronic device; and in response to the pause time being less than a predetermined pause time, the latency time being less than a predetermined latency time, and a third predetermined condition being satisfied, decreasing a value of the quantization parameter; and in response to the image processing on the electronic device being resumed, encoding a new image captured on the electronic device using the adjusted quantization parameter.

11. The electronic device according to claim 10, wherein the first predetermined condition comprises:

a difference between a first number of images already encoded by the electronic device and a second number of images already decoded by the other electronic device is greater than a predetermined number; or a difference between a first number of bits of images already encoded by the electronic device and a second number of bits of images already decoded by the other electronic device is greater than a predetermined number of bits.

12. The electronic device according to claim 11, wherein the parameter is a quantization parameter, and the adjusting a parameter associated with an image compression ratio comprises:

in response to the pause time being greater than a predetermined pause time, increasing a value of the quantization parameter.

13. A computer program product being stored in a computer storage medium and comprising machine-executable instructions which, when executed on a first device, cause the first device to:

determine a first condition being satisfied for an image encoded by a first device and an image decoded by a second device, wherein the first condition comprises at least one of:

a difference between a first number of images already encoded by the first device and a second number of images already decoded by the second device is greater than a threshold number; or a difference between a first number of bits of images already encoded by the first device and a second number of bits of images already decoded by the second device is greater than a threshold number of bits;

pause image processing on the first device in response to the first condition being satisfied, the first device sharing a screen with the second device, the processing including one or more of capturing, encoding sending of an image;

determine a pause time of the pausing satisfying a second condition;

adjust a quantization parameter associated with an image compression ratio in response to the pause time satisfying the second condition;

determine the image processing on the first device being resumed; and encode a new image captured on the first device using the adjusted quantization parameter in response to the image processing on the first device being resumed.

14. The computer program product according to claim 13, wherein adjusting the quantization parameter comprises:

determining the pause time being greater than a threshold pause time; and increasing a value of the quantization parameter.

15. The computer program product according to claim 13, wherein adjusting the quantization parameter comprises:

determining a latency time during which a specific image is sent from the first device to the second device;

determining the pause time being less than a threshold pause time;

determining the latency time being less than a threshold latency time;

determining a third condition being satisfied; and decreasing a value of the quantization parameter.

16. The computer program product according to claim 13, wherein the first device is further configured to decrease a value of the quantization parameter, wherein decreasing the value of the quantization parameter comprises:

determining a number of images which are sent while the pause time is less than a threshold pause time and a latency time is less than a threshold latency time;

determining the number of images being greater than a threshold number; and decreasing a value of the quantization parameter.

17. The computer program product according to claim 13, wherein the first device is further configured to decrease a value of the quantization parameter, wherein decreasing the value of the quantization parameter comprises:

determining a number of images which are sent while the pause time is less than a threshold pause time and a latency time is less than a threshold latency time;

determining the number of images being less than a first threshold number and being greater than a second threshold number;

determining a time length elapsed since a previous increase of a value of the quantization parameter;

determining the time length satisfying a threshold time length; and decreasing the value of the quantization parameter.

18. The computer program product according to claim 13, wherein encoding a new image captured on the first device using the adjusted quantization parameter comprises:

detecting that a first image and a second image captured continuously on the first device are partially the same;

determining a region of variation in the second image that includes content different from the first image;

selecting a codec suitable for the region of variation from a set of codecs, the set of codecs including a plurality of codecs having different encoding and decoding sizes; and encoding the second image using the selected codec.

19. The computer program product according to claim 18, further comprising:

sending the encoded second image and encoded region information from the first device to the second device, the encoded region information including a starting position and a size of an encoded region of the selected codec.

20. The computer program product according to claim 18, wherein encoding the second image using the selected codec comprises:

extracting a plurality of sub-regions of variation in the region of variation so that other region in the region of variation except the plurality of sub-regions of variation does not change;

determining a sum of a plurality of sub-encoded regions for the plurality of sub-regions of variation;

determining the sum of the plurality of sub-encoded regions being less than a threshold proportion of the encoded region for the region of variation; and encoding the second image using the plurality of codecs for the plurality of sub-regions of variation.

* * * * *